United States Patent Office 3,110,506
Patented Nov. 12, 1963

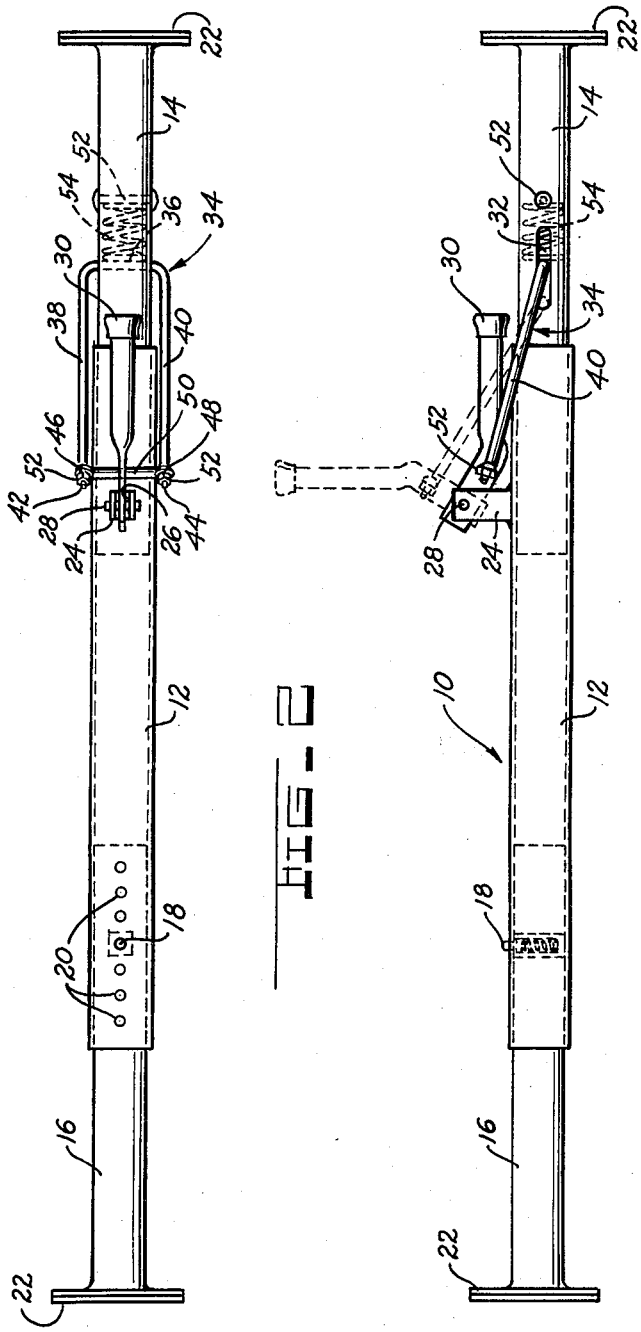

3,110,506
CARGO OR LOAD HOLDER
Thomas N. O'Brien, 1004 Townline Ave., Beloit, Wis.
Filed Aug. 8, 1962, Ser. No. 215,702
3 Claims. (Cl. 280—179)

The present invention relates to an extensible cargo or load holder having improved means for securely positioning the holder in extended position without injury to the engaged walls of the truck or cargo carrier.

It is an object of the present invention to provide in an extensible cargo holder, having a pair of telescopic members, means for exerting a predetermined substantially constant force to urge said members axially outwardly into engagement with the walls of a cargo carrier.

It is another object of the present invention to provide improved actuating means for extending an extensible cargo holder which is simple in construction and reliable in operation.

These and other objects and advantages of the present invention will become readily apparent from the following detailed description taken in connection with the appended drawings in which:

FIGURE 1 is a front view of a cargo holder embodying the present invention; and

FIGURE 2 is a top view of the cargo holder shown in FIGURE 1.

Referring now to the drawings, numeral 10 designates a cargo or load holder having first and second telescopic tubular members respectively designated 12 and 14. A third tubular member 16 is reciprocably disposed in member 12 and carries a spring-loaded plunger 18 which is adapted to selectively engage one of the holes 20 formed in member 12. Wall gripping means or pads 22 are secured to the outer ends of members 14 and 16.

An arm 24 extends radially from member 12 and is slotted as at 26. A pivot pin 28 is mounted in arm 24 and extends transversely to the axis of member 12 to span the slot 26. A lever or handle 30 is rotatably secured or mounted adjacent one of its ends on pivot pin 28. Member 14 is provided with a pair of axially extending transversely aligned slots 32 respectively formed in the side walls thereof. A substantially U-shaped rod 34 is mounted with its transverse section 36 reciprocably disposed in slots 32. The parallel arms 38 and 40 of U-shaped rod 34 have reduced end sections 42 and 44 respectively which pass through holes 46 and 48 formed in the ends of a transversely extending bar or arm 50 which is journalled in lever 30. Suitable nuts 52 secure the ends of arms 38 and 40 to the transverse bar 50.

A spring retaining means or pin 52 is mounted in member 14 and is adapted to engage one end of a compression spring 54 which is disposed in member 14 between the retainer 52 and the transverse section 36 of rod 34.

In operation, when the cargo holder 10 is in its retracted position, the position of parts is as shown in dotted lines. To place the cargo holder in its extended position the handle 30 is rotated in a clockwise direction as shown in FIGURE 1 to the full-line position. In the course of rotating handle 30, the transverse section 36 of rod 34 is moved from its extreme left hand position a predetermined distance to its extreme right hand position, thereby compressing spring 54 a predetermined amount to urge the members 12 and 14 axially outwardly with substantially constant force. During the rotation of the handle 30 from the retracted position to the extended position of the cargo holder, the line of force through arms 38 and 40 of rod 34 passes through the pivot 28 to lie between the pivot and the surface of tubular member 12 so that when the handle 30 is in the position shown in FIGURE 1 the handle is locked to maintain the cargo holder in its extended position.

The U-shaped rod 34, in addition to being an actuating member, also serves to prevent the members 12 and 14 from separating or coming apart to thereby facilitate the handling of the cargo holder and is particularly useful when the cargo holder is to be installed in an off-horizontal position. The member 16 with spring loaded plunger 18 permits the cargo holder to be adjusted to the nominal size of widely varying cargo openings.

The actuating means of the present invention which provides a substantially constant force through spring 54 to urge the cargo holder towards extended position has a substantial advantage in inherently preventing injury to the walls of the cargo carrier or injury to the cargo holder itself as frequently happens with positive-acting cargo holders. Such positive acting cargo holders utilizing ratchets, jacks or the like, when used in aluminum truck trailers frequently deform or pierce the truck walls. When the positive acting cargo holders are used against rigid walls such as in a railroad car, there have been numerous occurrences of injury to the cargo holder itself due to excessive force being applied by the operator in extending the cargo holder. The cargo holder of the present invention prevents an over enthusiastic operator from either injuring the cargo holder or the walls of the cargo carrier and yet provides a predetermined force sufficient to securely position the cargo holder.

While only one embodiment of my invention has been shown and described, it will be readily apparent to those skilled in the art that various changes and modifications may be made without departing from the spirit of the invention.

I claim:
1. A cargo or load holder comprising:
   first and second telescopic tubular members,
   wall gripping pads secured to the outer ends of said members,
   pivot means mounted on said first member,
   a lever rotatably secured adjacent one end thereof to said pivot means,
   a pair of axially extending transversely aligned slots respectively formed in opposite side walls of said second member,
   a substantially U-shaped rod having a transverse section reciprocably mounted in said slots,
   a bar journalled in said lever intermediate the ends thereof,
   means for securing the ends of said rod to said bar,
   spring retainer means formed in said second member, and
   a compression spring disposed in said second member between said retainer means and the transverse section of said rod whereby rotation of said lever in one direction compresses said spring to urge said members to extend axially outwardly.
2. A cargo or load holder comprising:
   first and second telescopic tubular members,
   wall gripping means secured to the outer ends of said members,
   a radially extending arm formed on said first member,
   a transversely extending pivot pin mounted on said arm adjacent the free end thereof,
   a lever rotatably secured adjacent one end thereof to said pivot pin,
   a transversely extending arm rotatably secured to said lever a predetermined distance from said pivot pin, axially extending slots formed in opposite side walls of said second member, a substantially U-shaped rod having a transverse section reciprocably disposed in said slots, means for securing the ends of said rod to said transversely extending arm, retainer means formed in said second member, and resilient means disposed in said second member between said retainer means and said transverse section of said rod, said lever means being rotatable to one of its extreme positions to move said transverse section of said rod to compress said resilient means to urge said members axially outwardly, the line of force passing between said pivot pin and said first member when said lever is in said extreme position.

3. A cargo or load holder comprising:

first and second telescopic tubular members, pivot means formed on said first member, a lever rotatably mounted on said pivot means, a retainer in said second member, spring means disposed in said second member for engagement of one thereof with said retainer, axially extending slot means formed in said second member, rod means reciprocably disposed in said slot means and being rotatably connected to said lever, whereby rotation of the lever moves said rod means axially in said slot to compress said spring to urge said members axially outwardly, the line of force through said rod means passing through said pivot means as the rod means is moved from one of its extreme positions in said slot means toward the other of its extreme positions.

References Cited in the file of this patent

UNITED STATES PATENTS

| | | |
|---|---|---|
| 1,763,034 | Bunker | June 10, 1930 |
| 1,968,807 | Bowers | Aug. 7, 1934 |
| 2,411,768 | Welch | Nov. 26, 1946 |
| 3,049,328 | Bishop | Aug. 14, 1962 |

FOREIGN PATENTS

| | | |
|---|---|---|
| 64,968 | Netherlands | Dec. 15, 1949 |